United States Patent Office 3,655,617
Patented Apr. 11, 1972

3,655,617
HARDENING OF POLYEPOXY COMPOUNDS WITH DICYANDIAMIDE AND A HETEROCYCLIC SECONDARY AMINE ACCELERATOR
Wolfgang Imoehl, Unna, and Peter Borner, Altlunen, Germany, assignors to Schering AG., Bergkamen, Germany
No Drawing. Filed Feb. 13, 1970, Ser. No. 11,288
Claims priority, application Germany, Feb. 18, 1969,
P 19 08 752.6
Int. Cl. C08g 30/14
U.S. Cl. 260—47 EN
15 Claims

ABSTRACT OF THE DISCLOSURE

Process for hardening polyepoxides with dicyandiamide in the additional presence of a heterocyclic accelerator containing an imine group. Thermally hardenable mixtures comprising a polyepoxide, dicyandiamide, and such a heterocyclic accelerator. Hardening agents for polyepoxides comprising dicyandiamide and the reaction product of such a heterocyclic accelerator with a polyepoxide compound.

---

The present invention relates to methods of hardening polyepoxy compounds, to hardening agents for polyepoxy compounds, and to thermally hardenable systems comprising a polyepoxy compound and a hardening agent therefor.

Dicyandiamide has long been used in the art as a latent hardening agent for epoxy compounds (cf. Swiss Pat. 257,115) in amounts of 1–20 parts, preferably 6–10 parts, of dicyandiamide per 100 parts by weight of epoxy compound. The temperatures required for achieving sufficient hardening are quite high, normally about 200° C. If the hardening temperature is lowered, for example to 170° C., very long hardening times become necessary.

As a practical matter, however, thermally-hardening systems having a relatively low hardening temperature and the shortest possible hardening times are desired for most purposes. This is particularly true for electrostatic coating, which requires epoxy powder systems whose hardening temperatures are lower than in the epoxy-dicyandiamide systems.

It is further known in the art to employ secondary amines as hardening agents for epoxides. The results obtained are, however, not satisfactory. The quaternary ammonium salts disclosed in U.S. Pat. 2,928,811, the acyl guanidine of Dutch patent application 6,614,563, the hexamethylene triamine described in Belgian Pat. 697,383, the substituted triazine of U.S. Pat. 3,366,601, and some tertiary amines heretofore known as accelerators for the hardening of epoxy compounds with dicyandiamides either show an insufficient accelerating effect or detrimentally influence the useful properties of the hardened products. Thus, the addition of accelerators, for example to epoxy powder coatings comprising dicyandiamide, often leads to poor flow properties and to a decreased adherence of the coating film. Long hardening times, which are required when substances having only a minimal accelerating effect are added, render the systems practically unusable or economically uninteresting.

A process has now been found for hardening epoxy compounds having more than one 1,2-epoxy group in the molecule (hereinafter referred to as "polyepoxides") by employing dicyandiamide in the same amounts heretofore employed in the art in the presence of a heterocyclic secondary amine accelerator, i.e. a compound containing an imine group. In the amine accelerator, the NH-group, together with four or five carbon atoms, forms a heterocyclic 5- or 6-member ring in which the carbon atoms are bonded through single or double bonds and are substituted with hydrogen atoms and/or alkyl groups. The accelerators of the invention also include compounds in which two or more such 5- or 6-membered heterocycles are connected by an aliphatic bridge, suitably a lower alkylene bridge, for example one having 2–4 carbon atoms.

In preferred embodiments of the process of the invention, the accelerator is added in amounts of from 0.1–6 parts per 100 parts by weight of epoxy compound. Other embodiments employ all or a portion of the amine accelerator in the form of a pre-addition product with an equivalent amount of an epoxy compound. Such addition products are formed by mixing the reactants and warming to temperatures between about 40° C. and about 150° C.

The thermally hardenable systems of the present invention comprise: (1) a polyepoxide; (2) dicyandiamide; and (3) the aforementioned heterocyclic secondary amines. Hardening agents for polyepoxides according to the present invention comprise a mixture of (1) addition products of the epoxy compounds with the aforementioned heterocyclic secondary amines and (2) of dicyandiamide.

The acceleration brought about by the amines employed according to the invention is surprising, since aliphatic, aromatic, and aromatic-aliphatic secondary amines such as diethylamine, dibutylamine, dicyclohexylamine, methyl aniline, or diphenylamine exhibit scarcely any accelerating effect on the hardening of epoxides with dicandiamides (cf. Table I).

In contrast, the cyclic amines of the present invention accelerate the hardening noticeably and produce hardened products without outstanding useful properties. Since the efficacy of the accelerators according to the invention shows gradual variations, the hardening process can be influenced by the nature and concentration of the accelerator employed, and may thus be modified to meet whatever requirements are presented. In general, the systems of the present invention harden at temperatures between about 100° C. and about 230° C.

Suitable accelerators according to the invention are, for example, pyrrolidine, pyrroline, pyrrole, piperidine, and bis(4-piperidyl)-propane-1,3. The reaction products formed by the reaction of polyepoxy compounds with all or a portion of the amine accelerators of the invention similarly possess accelerating properties so that an accelerator according to the present invention can also be employed in this "pre-added form." It is also possible to subject the dicyandiamide to a pre-reaction in conventional fashion with a portion of the epoxide mass to be used.

As epoxy compounds, all those compounds which contain more than one epoxy group in the molecule are usable, such as the polyglycidyl compounds of diphenol, of alkyl-substituted or halogen-substituted phenols, of polyols, and condensation of products of formaldehyde and phenol, or of formaldehyde and alkyl- or halogen-substituted phenols. Further, polyglycidyl compounds of aromatic amines and of bis-phenols having the general formula

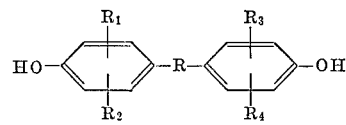

in which R is an alkyl radical, —S—, —S—S—, —SO—, —SO₂—, or —CO—, and R₁, R₂, R₃, and R₄ are hydrogen or halogen atoms, can be used. A preferred reagent is the polyepoxy compound formed between epichlorohydrin and 2,2-bis-(4-hydroxyphenyl)-propane.

The accelerated polyepoxy systems of the present invention find practical application where thermal hardening with dicyandiamide is desired at relatively low temperatures. These systems are particularly preferred, as is evident from the examples, in the technology of powder coatings.

The accelerating effect of the compounds according to the present invention on the hardening of polyepoxy compounds containing dicyandiamide can be determined with the help of differential thermal analysis. From the hardening curves, the position of the maximum and the maximum hardening velocity of the reaction mixture can be determined [cf. H. C. Anderson, Analytical Chemistry 32, 12, 1592–5 (1960) and R. Schmid, Kunststoffe 838 (1966)].

A better understanding of the present invention and of its many advantages can be had from the following specific examples, given by way of illustration.

EXAMPLE 1

7.8 parts by weight of diglycidyl ether prepared from 10 mols of epichlorohydrin and 1 mol of 2,2-bis-(4-hydroxyphenyl)-propane (epoxy value=0.54) were mixed with 1 part by weight of dicyandiamide and 0.088 part by weight (1 percent by weight) of amine additive and hardened by heating in a Perkin-Elmer differential-scanning calorimeter (Model DSC–1B) at a temperature rate of 8° C. per minute. The temperature at which the hardening curve reaches a maximum is given in following Table I for a number of reaction mixtures containing acyclic secondary amines. It is evident that the amines scarely influence the course of hardening of mixtures of epoxy compounds and dicyandiamide.

TABLE I

| Additive: | Reaction maximum (° C.) |
|---|---|
| Diethylamine | 187 |
| Dibutylamine | 190 |
| Dicyclohexylamine | 199 |
| Methylaniline | 200 |
| Diphenylamine | 200 |
| Control (no additive) | 200 |

In contrast, as shown in Table II the cyclic amines of the present invention show a strong accelerating effect on the hardening of polyepoxy compounds with dicyandiamide. Also, it is evident that the rate of hardening can be modified by altering the amount and nature of the catalyst. In obtaining the data for this Table, 7.8 parts by weight of diglycidyl ether prepared from 10 mols of epichlorohydrin and 1 mol of 2,2-bis(4-hydroxyphenyl)-propane (epoxy value=0.54) were hardened with 1 part by weight of dicyandiamide and amounts of the accelerators of the present invention as indicated.

TABLE II

| Accelerator | Reaction maximum (° C.) on addition of— | |
|---|---|---|
| | 3 weight percent of accelerator | 1 weight percent of accelerator |
| Piperidine | 140 | 157 |
| Pyrrole | 164 | 179 |
| Pyrrolidine | 121 | 137 |
| Dipiperidyl propane | 145 | 167 |

EXAMPLE 2

0.8 g. of dicyandiamide were thoroughly mixed with 1.4 g. of the product prepared by reacting 0.1 g. of pyrrolidine with 1.3 g. of a diglycidyl ether at a temperature of about 140° C. The epoxy compound was prepared from 1.3 mols of epichlorohydrin and 1 mol of 2,2-bis-(4-hydroxyphenyl)-propane and had an epoxy value=0.11. This hardener mixture was then reacted for six minutes at 100° C. with 30 grams of a diglycidyl ether prepared from 1.3 mols of epichlorohydrin and 1 mol of 2,2-bis-(4-hydroxyphenyl)-propane (epoxy value=0.11). The cooled product was subsequently comminuted and finely powdered.

Coatings prepared with this powder, after hardening at 140° C. for 30 minutes, had a value of 9 mm. when tested by the Erichsen scratch test (DIN 53 156).

EXAMPLE 3

For the preparation of a first component, A, 15.2 g. of the epoxy compound used in Example 2 (epoxy value =0.11) were mixed thoroughly with 0.8 g. of dicyandiamide for 6 minutes at 110° C. A second component, B, was prepared by reacting 15.2 g. of the same epoxy compound of Example 2 with 0.1 g. of bis-(4-piperidyl)-propane-1,3 at 100° C. for 6 minutes with thorough mixing.

16 g. of component A and 15.3 g. of component B were then reacted with intensive mixing for six minutes at 110° C. Subsequently, the cooled reaction product was broken up and powdered. Films prepared using this powder show an Erichsen scratch test value of 9 mm. after hardening at 170° C. for 30 minutes.

What is claimed is:

1. In a process for the thermal hardening of a 1,2-polyepoxy compound in admixture with dicyandiamide, the improvement wherein an accelerator containing an imine group is additionally present, said accelerator being (1) a 5- or 6-membered heterocyclic secondary amine having an —NH-group joined to 4 or 5 carbon atoms which are joined to each other by single or double bonds or (2) a compound in which two or more of such heterocycles are connected by an aliphatic bridge.

2. A process as in claim 1 wherein from 0.01 to 6 parts of accelerator are present per 100 parts by weight of 1,2-polyepoxy compound.

3. A process as in claim 1 wherein all or a portion of said accelerator is pre-reacted with an equivalent quantity of 1,2-polyepoxy compound before addition to said mixture of 1,2-polyepoxy compound and dicyandiamide.

4. A thermally hardenable mixture comprising (A) a 1,2-polyepoxy compound; (B) 1–20 parts of dicyandiamide per 100 parts by weight of (A); (C) 0.1–6 parts, per 100 parts by weight of (A), of an accelerator containing an imine group, said accelerator being (1) a 5- or 6-membered heterocyclic secondary amine having an —NH-group joined to 4 or 5 carbon atoms which are joined to each other by single or double bonds or (2) a compound in which two or more of such heterocycles are connected by an aliphatic bridge.

5. A hardening agent for 1,2-polyepoxy compounds, said agent comprising (A) dicyandiamide and (B) the reaction product of equivalent amounts of a 1,2-polyepoxy compound and an accelerator containing an imine group, said accelerator being (1) a 5- or 6-membered heterocyclic secondary amine having an —NH-group jointed to 4 or 5 carbon atoms which are joined to each other by single or double bonds or (2) a compound in which two or more of such heterocycles are connected by an aliphatic bridge.

6. A hardening agent as in claim 5 comprising 1–20 parts by weight of dicyandiamide and 0.1–6 parts by weight of said accelerator.

7. In a process for the thermal hardening of a 1,2-polyepoxy compound in admixture with dicyandiamide, the improvement which comprises using as a hardening accelerator a compound in which two or more heterocyclic rings are connected by an aliphatic bridge, said rings being secondary amine groups having an NH group joined to 4 or 5 carbon atoms which are joined to each other by single or double bonds.

8. A process according to claim 7 wherein the accelerator is a compound in which two of said heterocyclic rings are connected by an alkylene bridge having 2 to 4 carbon atoms.

9. A process according to claim 8 wherein said accelerator is bis-(4-piperidyl)-propane-1,3.

10. A thermally hardenable mixture comprising a 1,2-polyepoxide, from 1 to 20 parts of dicyandiamide per 100 parts of polyepoxide of an accelerator which is a compound in which two or more heterocyclic rings are connected by an aliphatic bridge, said rings being secondary amines having an NH group joined to 4 or 5 carbon atoms which are joined to each other by single or double bonds.

11. A hardening agent for 1,2-polyepoxides comprising dicyandiamide and the reaction product of equivalent amounts of 1,2-polyepoxide and a hardening accelerator which is a compound in which two or more heterocyclic rings are connected by an aliphatic bridge, said heterocyclic rings being secondary amines having an NH group joined to 4 or 5 carbon atoms which are joined to each other by single or double bonds.

12. A process according to claim 1 wherein said accelerator is piperidine.

13. A process according to claim 1 wherein said accelerator is pyrrolidine.

14. A process according to claim 1 wherein said accelerator is pyrroline.

15. A process according to claim 1 wherein said accelerator is pyrrole.

References Cited

UNITED STATES PATENTS

| 3,530,093 | 9/1970 | Maurer | 260—2 X |
| 3,228,957 | 1/1966 | Fremery | 260—47 X |
| 3,294,864 | 12/1966 | Karoly et al. | 260—47 X |

OTHER REFERENCES

Handbook of Epoxy Resins, by Lee et al., 1967 (pp. 6–9, 10, 13, 14).

WILLIAM H. SHORT, Primary Examiner

T. E. PERTILLA, Assistant Examiner

U.S. Cl. X.R.

117—161 ZB; 252—182; 260—2 N, 59